(12) United States Patent
Elder et al.

(10) Patent No.: US 7,953,210 B2
(45) Date of Patent: *May 31, 2011

(54) SWITCH PROXY FOR PROVIDING EMERGENCY STAND-ALONE SERVICE IN REMOTE ACCESS SYSTEMS

(75) Inventors: Joseph Marcus Elder, Boulder, CO (US); Peter Gade Ruether, Longmont, CO (US)

(73) Assignee: Aztek Engineering, Inc., Boulder, CO (US)

( * ) Notice: Subject to any disclaimer, the term of this patent is extended or adjusted under 35 U.S.C. 154(b) by 1351 days.

This patent is subject to a terminal disclaimer.

(21) Appl. No.: 11/475,666

(22) Filed: Jun. 27, 2006

(65) Prior Publication Data
US 2007/0071182 A1 Mar. 29, 2007

Related U.S. Application Data

(63) Continuation-in-part of application No. 11/257,140, filed on Oct. 24, 2005, now Pat. No. 7,680,252.

(60) Provisional application No. 60/694,146, filed on Jun. 27, 2005.

(51) Int. Cl.
*H04M 11/00* (2006.01)

(52) U.S. Cl. .......................... 379/45; 379/37
(58) Field of Classification Search .............. 379/45, 379/37

See application file for complete search history.

(56) References Cited

U.S. PATENT DOCUMENTS

| | | | |
|---|---|---|---|
| 5,166,972 A * | 11/1992 | Smith ........................... | 379/49 |
| 5,388,145 A | 2/1995 | Mulrow et al. | |
| 5,418,776 A | 5/1995 | Purkey et al. | |
| 5,454,025 A | 9/1995 | Mulrow et al. | |
| 5,912,963 A | 6/1999 | Begeja et al. | |
| 6,041,109 A | 3/2000 | Cardy et al. | |
| 6,064,722 A | 5/2000 | Clise et al. | |
| 6,069,948 A | 5/2000 | Yrjana | |
| 6,366,662 B1 | 4/2002 | Giordano et al. | |
| 6,504,922 B1 | 1/2003 | Erb | |
| 6,600,811 B1 | 7/2003 | Patel et al. | |
| 6,721,395 B2 | 4/2004 | Martinez | |
| 6,731,721 B2 | 5/2004 | Tanaka et al. | |
| 6,775,368 B1 | 8/2004 | Lee et al. | |
| 7,680,252 B2 * | 3/2010 | Elder ........................ | 379/37 |
| 2003/0163526 A1 | 8/2003 | Clarisse et al. | |
| 2003/0198331 A1 | 10/2003 | Lass et al. | |
| 2004/0156493 A1 | 8/2004 | Cohen | |
| 2004/0223450 A1 | 11/2004 | Bridges et al. | |
| 2005/0053059 A1 * | 3/2005 | Smith ........................ | 370/376 |
| 2005/0152515 A1 | 7/2005 | Amir et al. | |
| 2005/0175166 A1 | 8/2005 | Welenson et al. | |
| 2006/0072732 A1 | 4/2006 | Varble et al. | |

* cited by examiner

Primary Examiner — Stella L Woo
(74) Attorney, Agent, or Firm — Dorr, Carson & Birney, P.C.

(57) ABSTRACT

A switch proxy comprising a controller, a translations database and a switching fabric are connected to a trunk group between a remote terminal and its controlling local switching system. The switch proxy monitors control and alarm signals to and from the switching system on the trunk. In the event of loss of control signals from the host switching system, the switch proxy intercepts requests for service, etc. from a calling telephone connected to the remote terminal and performs a look up in the translation database. If the call can be completed without the controlling switching system the call is looped back to the remote terminal. The translation database is maintained by a switch proxy management system that receives change orders from the local exchange carrier. The switch proxy management system forwards relevant changes to the switch proxy's translation database in the field.

26 Claims, 8 Drawing Sheets

SWITCH PROXY FOR PROVIDING EMERGENCY STAND-ALONE SERVICE IN REMOTE ACCESS SYSTEMS

RELATED APPLICATION

The present application is a continuation-in-part of U.S. patent application Ser. No. 11/257,140, entitled "Switch Proxy for Providing Emergency Stand Alone Service in Remote Access Systems," filed on Oct. 24, 2005, now U.S. Pat. No. 7,680,252. The present application also claims priority to U.S. Provisional Patent Application 60/694,146, filed on Jun. 27, 2005.

BACKGROUND OF THE INVENTION

This invention relates to access systems as used in wireline telephony and, more specifically, to a switch proxy for use in conjunction with an access system remote terminal to route telephone calls when communications between a remote terminal of an access system and its controlling switching system is lost.

Wireline telephone service providers use access systems to serve telephone subscribers that are not economically or practically served directly from the nearest local switching system. Examples of access systems of this type include subscriber loop carriers and digital loop carriers (or DLC's). An access system consists of a remote terminal that is connected to a local switching system (or central office or CO) by one or more digital trunk groups. The remote terminal can be located in a field cabinet, where the telephone subscriber's traditional copper pair is created in nearer proximity to the subscriber's premises. This capability improves the service that the subscriber receives and provides the telephone service provider with an economic alternative to long cable runs from the local switching system.

For engineering simplicity, remote terminals are typically designed to have very little independent operational capability. They rely on the host switching system for essentially all of the intelligence that would normally be associated with origination, routing and completion of a telephone call. The subscriber lines terminate at the remote terminal, which converts the voiceband signals into digital signals that are, in turn, multiplexed over digital channels on the trunk lines between the local switching system and the remote terminal. The trunk lines also carry separate digital channels for control information. The local switching system controls the remote terminal as if it were an extension of the switching system. For example, dial tone is sourced from the local switch and the dialed digits are collected by it.

In this manner, service providers are afforded more options in providing telephone service to subscribers. In particular, these access systems provide a much more economical approach to serve a small remote community of subscribers than the use of expensive local switching systems or proprietary remote switching modules. Typically DLC systems support between 100 and 2000 subscribers.

The simplicity of aggregating all of the call control functionality in the host switching system creates a problem in the art. That is, when the host switching system is unable to communicate with the remote terminal, either through failure of components of the digital trunks or of the switching system itself, subscribers served by the remote terminal no longer have any telephone service. Even though the connectivity with the greater network is lost and the remote terminal may be otherwise fully functional, the subscribers terminated on this remote system still cannot communicate with one another. The severity of this problem may be confounded by the fact that these subscribers are frequently served by this technology precisely because they are remote. These remote settings necessitate the use of local emergency responders and limit other communications options (e.g., cellular telephony). Therefore, the ability to continue to locally switch calls between subscribers served by remote systems that have lost communications with a host switching system is an important public safety consideration.

In urban deployments, the loss of connectivity to an access system may be only a minor inconvenience; nearby neighbors may be served from another system and cellular service will probably be available. Furthermore, urban densities allow for engineering the transport facilities with extra capacity that allows for "fail over" to protection facilities.

In rural settings, the remote terminal may provide the telephone services for an entire community. These rural communities could be very isolated from other communities and cellular service may be non-existent. Loss of communications between the host switch and the remote terminal in these circumstances could result in more serious consequences than in urban scenarios.

To mitigate the potential negative impact on public safety and communication among members of the community during such service outages, some rural public utility commissions and other agencies have promoted inclusion of Emergency Stand Alone (ESA) capabilities in telephone access systems. ESA capabilities typically include the ability for subscribers to dial 9-1-1 to reach public safety personnel and to complete telephone calls among the members of the local community isolated by the service outage.

The Public Safety Answering Point (PSAP) is normally the location where operators answer emergency calls and dispatch first responders. Usually, telephone services to a PSAP are provided directly from a central office and not from a DLC system. This is for a variety of reasons, including the fact that PSAPs generally require special trunks (e.g., CAMA trunks) to carry Automatic Number Identification (ANI) and Automatic Location Identification (ALI) information to emergency operators, and DLC systems typically do not support such special trunks. Therefore, isolated ESA systems (in emergency mode) will usually need to direct 9-1-1 calls to an alternative location, to a 9-1-1 designate, rather than to a PSAP. The 9-1-1 designate will, of course, need to be a subscriber served by the ESA system while in emergency mode, a sheriff's substation or a local fireman's home, for example, may be chosen for this responsibility.

Other suggestions in the prior art pertain to installation of a "miniature" switching system in the proximity of the remote terminal to serve as a local host. This approach is not only expensive but impractical on several counts:
  i) it changes the basic architecture of the exchange network,
  ii) it increases the number of switches to administer and maintain,
  iii) it actually increases the probability of a service outage by putting another switching system into the chain, and
  iv) these remote terminals are frequently installed in field cabinets where it may be impossible to install an additional complex system.

Thus, there currently does not exist an economical or practical scheme for providing emergency stand alone service to subscribers served by the installed base of access systems. In addition, this invention discloses methods by which a 9-1-1 designate may be informed when incoming calls are emergency calls and be provided with information related to the caller similar to that available to a PSAP operator to insure proper handling of the call. In particular, the present invention addresses these issues by providing a ESA-capable system that enables 9-1-1 designates to be informed of the name, telephone number and address of emergency callers during these service outages.

SUMMARY OF THE INVENTION

This problem is solved and a technical advance is achieved in the art by a system and method that provides a switch proxy to control one or more remote terminals when connection to a host switching system is lost. A switch proxy in accordance with this invention comprises a controller, a translations database and a switching fabric, which are connected to the trunk group between the remote terminals and the local switching system. The controller, translations database and switching fabric are so adapted and configured that: a translations database maintains translations for its associated remote terminal (s) and the switching fabric has a capacity to switch calls among subscribers served by that switch proxy and its subtended remote terminals. Thus, no modification of existing infrastructure, either in the switching system or the remote terminal, is needed, except to introduce this switch proxy in the trunk group between the local switching system and the remote terminal. Indeed, neither the host switching system nor the remote terminal need be aware of the existence of this switch proxy for proper operation.

In accordance with one aspect of this invention, the switch proxy monitors control signals on the trunk group between the remote terminal and its controlling switching system. In the event of loss of communication of control signals on the trunk group, the switch proxy seizes control of all or a subset of the trunk group and re-establishes the interface with the remote terminal with itself acting as the "host switching system" thereby becoming the proxy for the actual host system. To the remote terminal, it appears as though a short outage with the switching system has occurred followed by restoration of some or all of the services from the switching system. The switch proxy intercepts requests for service, etc., from a calling telephone connected to the remote terminal and performs a look up in the translation database. If the call can be completed within the isolated remote system (i.e., the call is for a telephone also connected to the remote terminal or another subtended remote terminal), the controller of the switch proxy causes the switching fabric to loop the call back to the remote terminal and the causes the remote terminal to perform ringing and other such functions as required to establish the call. The switch proxy continues to monitor the transmission links towards the host switching system and when it ascertains that stable communications with that system have been restored, it initiates the process of dropping calls that it is carrying and reverts to monitoring, thus allowing the host switching system to resume providing service to the remote terminal. The switch proxy again takes up the role of monitoring the trunk group between the host switching system and the remote terminal.

Importantly, the switch proxy's translation database is maintained by a switch proxy management system, this translation database as a minimum maintains correspondence between a telephone subscriber's physical appearance (port address) on the remote terminal and its telephone number. Advantageously, as subscribers are rearranged by the telephone service provider, change orders for several remote terminals may be received and processed by the same switch proxy management system. The switch proxy management system forwards relevant changes to each switch proxy's translation database. Further, maintenance and updates to the switch proxy itself may be made in the same fashion. In this manner, a low-cost switch proxy may be used to maintain telephone service on a remote terminal when the remote terminal is disconnected from its host switching system.

BRIEF DESCRIPTION OF THE DRAWINGS

A more complete understanding of this invention may be obtained from a consideration of this specification taken in conjunction with the drawings, in which.

DETAILED DESCRIPTION OF THE INVENTION

Figure 1:
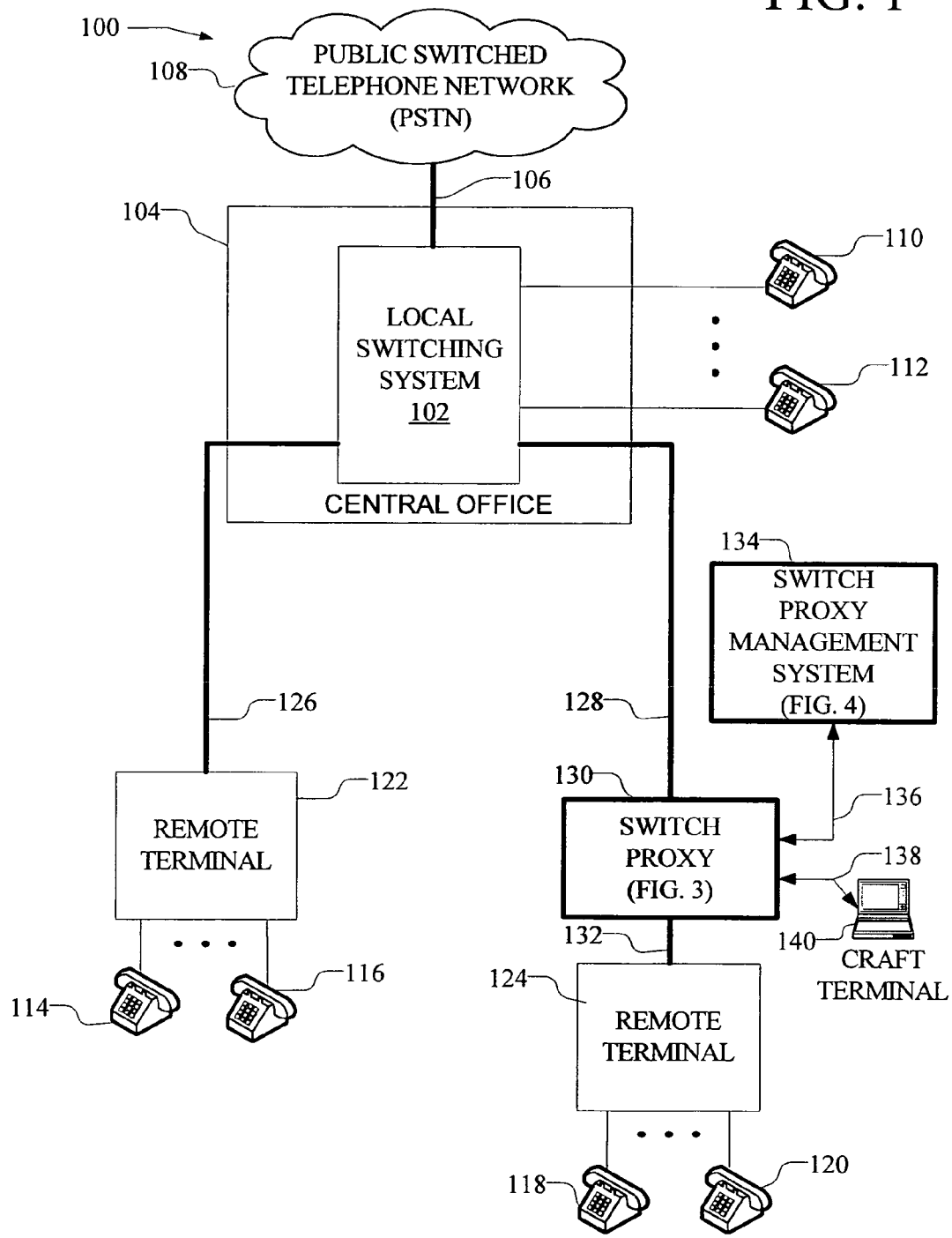
FIG. 1 is a block diagram of a wireline telephone system in which an exemplary embodiment of this invention is implemented.

FIG. 1 is a block diagram of a wireline local telephone network 100 in which an exemplary embodiment of this invention operates. In the wireline local telephone network 100 of FIG. 1, a local switching system 102 (also referred to herein as local switch 102 or switching system 102), typically residing in a central office 104 is connected through trunk group 106 to the public switched telephone network (PSTN) 108 which provides for interconnectivity with subscribers worldwide. This configuration is used herein for convenience and clarity in describing the invention; it is well known in the art that local switching system 102 is part of PSTN 108. A plurality of telephone subscribers 110, 112 may be connected directly to the local switching system through subscriber lines. Additionally, a plurality of subscribers 114, 116, 118, and 120 may be supported from remote terminals 122 and 124 which interconnect to the local switch through trunk groups 126 and 128 respectively. In the present context, a trunk group (also referred to herein as a trunk or trunks) consists of one or more physical transmission media (e.g., fiber optical cables or T1 lines) transporting a multiplicity of digital channels between network elements such as, but not limited to, trunk group 126 between local switching system 102 and remote terminal 122. In general, remote terminals 122 and 124 consolidate and concentrate signals to and from the customer telephones 114, 116, 118, and 120 and connect these distant telephone subscribers to the local switch 102 over trunks 126 and 128 that have a capacity to support many voice and data channels over long distances. Such access system remote terminals as 122 and 124 are also known in the art as subscriber loop carriers ("SLCs") and digital loop carriers ("DLCs") and are functionally referred to as remote terminals. In accordance with this invention, a switch proxy 130 (illustrated herein in heavy block line and described in more detail in conjunction with FIG. 3) residing logically between the remote terminal 124 and the trunk 128 maintains telephone services between subscribers 118 and 120 served by remote terminal 124 when communications with local switch 102 is lost, for whatever reason. In this manner, some basic services that formerly were not provided when remote terminal 124 was isolated from local switching system 102 are now available. For illustration purposes, assume that remote terminal 124 provides service to a rural community many miles from local switching system 102. Further, assume that telephone 120 is a telephone at a local public safety provider, such as (but not limited to) a local fire department or county sheriff's office. In the prior art, should communications with the local switch fail, a caller at telephone 118 could not contact telephone 120 in an emergency, even though both telephones are in the same community and the remote terminal is fully functional. In accordance with this invention, switch proxy 130 takes over during an outage and provides at least limited local service. Thus, telephone 118 can be connected to telephone 120 in accordance with this invention, even when local switching system 102 cannot provide service.

Figure 2:
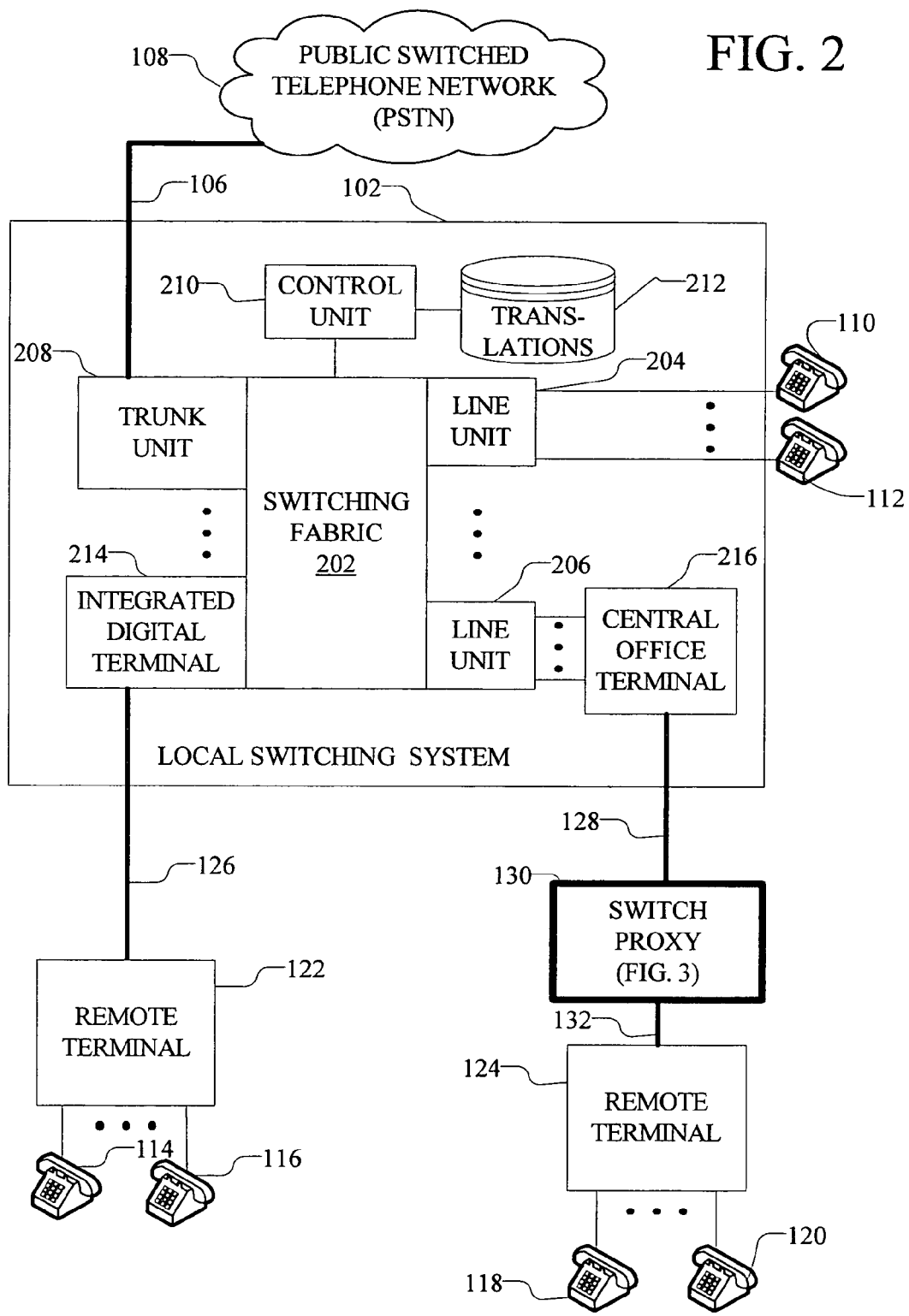
FIG. 2 is a block diagram expanding on the details of FIG. 1.

FIG. 2 further illustrates some interface details of subscribers 110 and 112 supported directly from switch 102, and subscribers 114, 116, 118 and 120 deployed behind remote terminals 122 and 124 hosted by local switch 102. Local switch 102 contains a switching fabric 202 that interconnects, on a channel-by-channel basis, a plurality of line units, herein represented by line units 204 and 206 and trunk units, herein represented by trunk unit 208. These trunk and line unit subsystems serve to adapt the circuits useful to the network, such as telephone lines, to a format that can be switched by switching fabric 202. Switching system 102, as is well known in the art, provides many other functions such as billing and operator services, etc., which do not contribute to the understanding of this invention and are thus not described. Switching fabric 202, line units 204, 206 and trunk unit 208 are all well known in the art, do not form part of the invention and thus are not further described.

A control unit 210 causes switching fabric 202 to connect a particular line (or member of a trunk group) to another based on information contained in translations database 212 which associates an internal physical port address to a designation useful to the network, such as, a telephone number. When interfacing to access systems a special line unit called an integrated digital terminal ("IDT") 214 can be used to interface directly with digital trunks 126 to communicate with and control remote terminal 122. An alternative approach is represented by the use of a central office terminal 216 to convert a plurality of subscriber lines originating on line unit 206 into a multiplexed digital signal carried by digital trunk 128 that communicates to the remote terminal 124. One skilled in the art will appreciate that the control signals embedded in trunks 126 and 128 must provide similar services and may, in fact, be identical regardless of the methodology (e.g., integrated digital terminal 214 or central office terminal 216) used to interface to switch 102. These cases illustrate that the subscriber lines deployed using access systems do not differ significantly from those supported directly from switch line units in that they rely on the local switch for dialed digit collection, switching, translation, and other services.

As is standard in the art, control unit 210 of local switch 102 controls all remote terminals (herein 122 and 124). Thus, when a telephone (such as telephone 114) goes off-hook, remote terminal 122 detects the off-hook condition and reports the off-hook condition to integrated digital terminal 214. Integrated digital terminal 214 forwards the information to control unit 210. Control unit 210 causes switching fabric 202 to provide dial tone through integrated digital terminal 214, digital trunk 126 and remote terminal 122 to telephone 114. Telephone 114 then sends dual-tone, multifrequency signals (or dial pulses) back to control unit 210, which decodes the signals into dialed digits and performs a look-up in translations database 212 to determine how to handle the call. As is well known in the art, the local switch 102, by means of controller 210 controls the setup and tear down of all calls, whether originating or terminating on subtended remote terminals 122 and 124. Signaling protocols are used between the access system remote terminal and the central office components (e.g., remote terminal 122 and integrated digital terminal 214, and remote terminal 124 and central office terminal 216, respectively) to coordinate the connection and signal the status of both ends. For example, GR-303 and GR-08, both generic requirements (GR) published by Telcordia, Inc. and well known in the art, are commonly used standards-based signaling protocols for providing telephone service through remote terminals. While some remote terminals (especially older remote terminals) use proprietary protocols, it is within the ability of one skilled in the art to build a switch proxy in accordance with whatever protocol may be used after studying this specification. The signaling uses bandwidth within the trunks interconnecting the remote terminal and the host switch (e.g., trunk 126 connecting host switch 102 and remote terminal 122) for messaging to convey status and cause actions, these messaging channels are also referred to as control signals.

Figure 3:
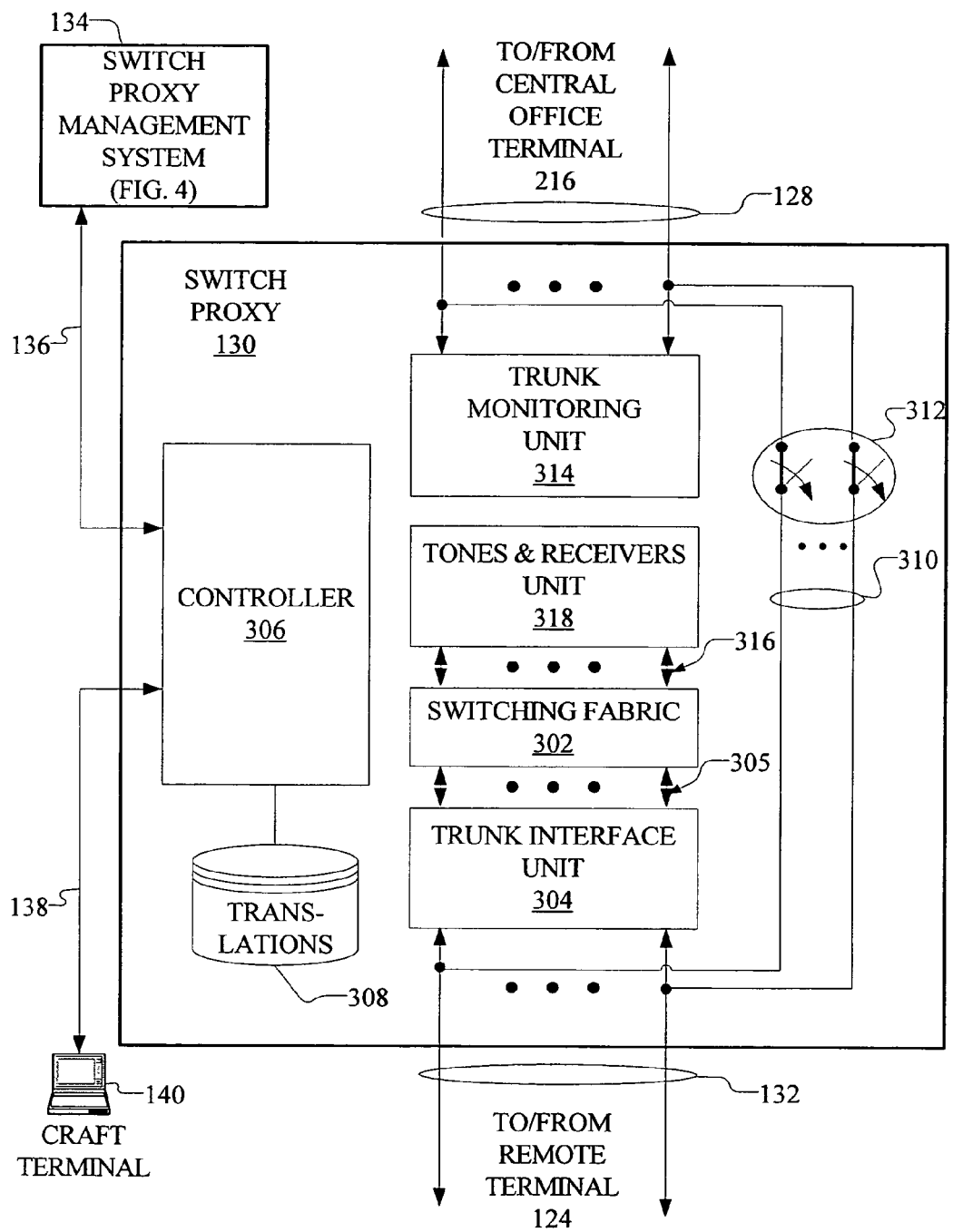
FIG. 3 is a block diagram of an exemplary embodiment of the switch proxy of FIG. 1 and FIG. 2.

FIG. 3 is a block diagram of switch proxy 130 illustrating certain exemplary aspects of this invention. In general, switch proxy 130 comprises a trunk monitoring unit 314, a switching fabric 302 interconnected with a trunk interface unit 304 by connections 305 and interconnected with tones and receivers unit 318 by connections 316, a bypass switch 312, and a controller 306 which coordinates the operations of all of the subsystems. In this exemplary embodiment, switching fabric 302 comprises a time slot interchange unit. One skilled in the art will appreciate that other types of switching fabrics (e.g., space division solid state or metallic switches) may be employed to the same end.

In this exemplary embodiment, bypass circuit 310 is connected around the operational units of switch proxy 130. Bypass circuit 310 includes a normally closed switch 312. That is, during normal operation of remote terminal 124 under control of local switching system 102, bypass switch 312 is closed and the switch proxy 130 is logically bypassed until such time as intervention is required. Thus, advantageously, failures within the switch proxy 130 are unlikely to affect normal operation of the remote terminal. A skilled practitioner of the art can suggest other embodiments in which this bypass circuit is not required, such as, but not limited to, passing the traffic actively from trunk 128 to trunk 132 through switch proxy 130.

A trunk monitoring unit 314 is connected to trunk 128 in parallel with bypass circuit 310 on the central office terminal 216 side of switch proxy 130. Trunk monitoring unit 314 monitors trunk 128 for control signals from local switching system 102 and/or responses from remote terminal 124 as well as alarm indications related to the serviceability of the trunk. When a service interruption is detected, trunk monitoring unit 314 notifies controller 306 while continuing to monitor trunk 128. Controller 306 causes switch 312 to open and begins to supervise trunk 132 from remote terminal 124 by means of trunk interface unit 304. Controller 306 sends and receives control signals to/from telephones connected to remote terminal 124 by means of the control channels embedded in trunks 132 in the same manner as local switch 102 does during normal operation. Based on information in these control signals, controller 306 causes switch fabric 302 to interconnect channels associated with subscribers in trunk 132 with the appropriate tones, dialed digit receivers and/or recorded announcements in tones and receivers unit 318. After collection of the dialed information either through interpretation of rotary digits or from dual tone multi-frequency digits received by the tones and receivers unit 318, the controller 306 consults the translation database 308 to determine if the call can be completed within the subscriber base supported by remote terminal 124 or another remote terminal (not shown) served by switch proxy 130. If the call can be completed, controller 306 causes switching fabric 302 to connect one telephone to another. If it is not possible to route the call (e.g., the subscriber is not served by a remote terminal subtended to switch proxy 130) controller 306 causes switching fabric 302 to connect the calling party to an appropriate tone or recorded announcement supplied by tones and receivers unit 318.

Controller 306 uses data stored in translation database 308 to provide such information as to determine what connections are possible as well as to provide translations between physical port addresses and telephone numbers. In addition, translation database 308 may contain information that would be useful to emergency responders such as, but not limited to: subscriber name and address, GPS coordinates, and prioritized emergency responders for each subscriber based on location. These data, or a subset thereof, in translation database 308 are synchronized to translation database 212 in local switch 102 regarding telephones connected to remote terminal 124. Such synchronicity may be provided by a centralized switch proxy management system (which will be described herein, below, in conjunction with FIG. 7) or manually through a local interface to switch proxy 130. Two exemplary approaches to management of the switch proxy 130 are illustrated in FIG. 3: a centralized switch proxy management system 134 is interconnected to the remote switch proxy 130 via communications means 136; alternatively, a local terminal 140 (sometimes referred to in the art as a craft terminal) interconnects with the switch proxy 130 through communications means 138. Communications means 136 and 138 can be, but are not limited to, dial-up modem, Ethernet, or direct serial connection as is well known in the art.

Figure 4:
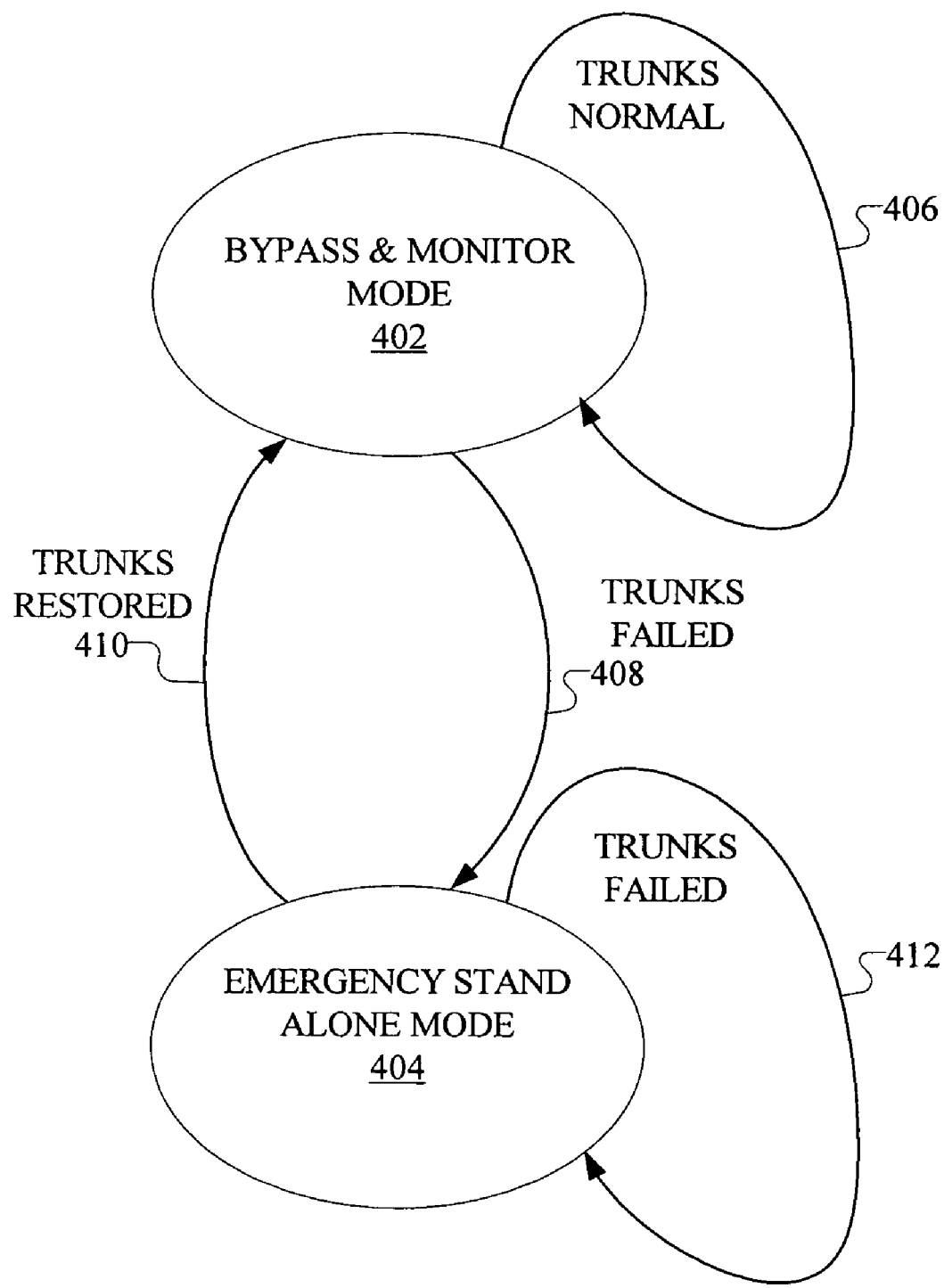
FIG. 4 is a state diagram illustrating the operational modes of a switch proxy.

An overview of the operational modes of switch proxy 130 are illustrated in FIG. 4 in conjunction with FIG. 3. As long as the remote terminal 124 continues to communicate normally with the host switch as determined by trunk monitoring unit 314, bypass switch 312 remains closed and the controller 306 operates in the bypass and monitoring mode 402 in FIG. 4. In this mode, the switch proxy 130 remains vigilant to the operational status of the trunks as shown in decision loop 406 but does not intervene in the control of remote terminal 124. When trunk monitoring unit 314 concludes that the control signals between the host switch 102 and remote terminal 124 have failed, controller 306 changes state through process 408 to the emergency stand alone mode 404 and takes action to assume control of remote terminal 124. While the system operates in emergency stand alone mode 404, trunk monitoring unit 314 continues to monitor the status of trunk group 128 and as indicated by decision loop 412 will remain in emergency stand alone mode 404 as long as trunk group 128 cannot communicate with host switch 102. While in emergency stand alone mode 404, controller 306 causes bypass switch 312 to open and asserts control of trunk 132 to remote terminal 124 by means of trunk interface unit 304. When trunk monitoring unit 314 ascertains that trunk group 128 has returned to operational status, controller 306 through process 410 restores the switch proxy 130 to bypass and monitor mode 402. One skilled in the art will appreciate that momentary and/or transient behaviors in trunk group 128 should not be cause for switch proxy 130 to transition between operational modes 402 and 404 or vice versa.

Figure 5:
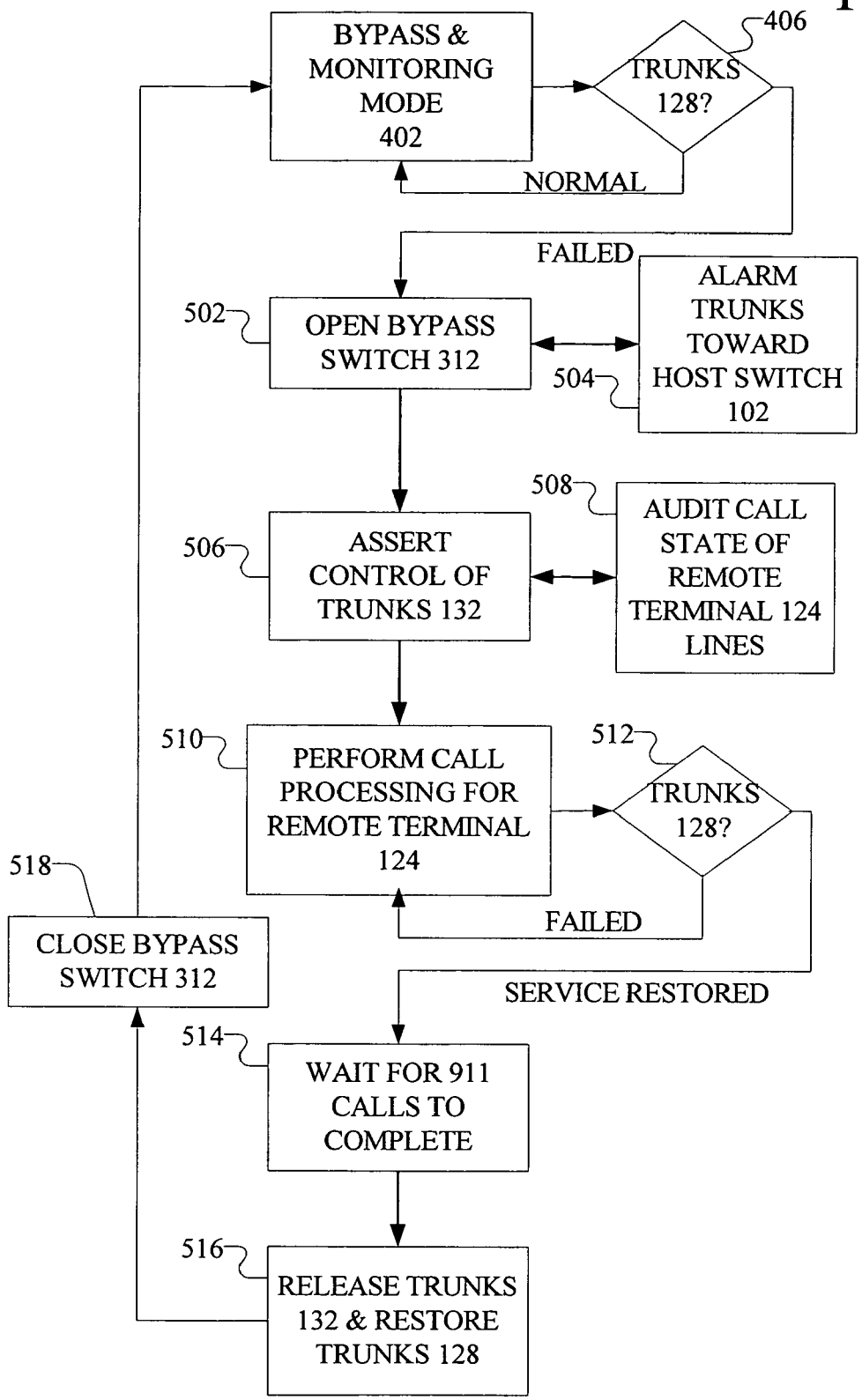
FIG. 5 is a flow chart describing an exemplary embodiment of the control functions of a switch proxy of FIG. 3.

FIG. 5 expands on the details of FIG. 4 and provides an exemplary embodiment of emergency stand alone operational mode 404. Processing begins in bypass and monitoring mode 402. When trunks 128 between the host switch 102 and the remote terminal 124 are no longer functional, decision block 406 passes processing to block 502 where bypass switch 312 is opened and simultaneously in block 504 trunks 128 are conditioned into an alarm state known in the art as "remote alarm indication" to assist in restoring service. In block 506 controller 306 by means of trunk interface unit 304 asserts control of trunks 132 towards remote terminal 124. In preparation for call processing and using the appropriate signaling protocol (e.g., GR-303) controller 306 in block 508 establishes communications with remote terminal 124 and ascertains and initializes the status (on-hook, off-hook, ringing, etc.) of the subtended subscriber lines through an audit process. Continuing on to block 510 switch proxy 130 now begins to process calls for remote terminal 124 and remains in that mode until such time as service with the host switch 102 has been restored. The status of these trunks is ascertained by interrogating trunk monitoring unit 314 in decision block 512. At such time as stable service in trunks 128 has been restored, processing transitions to block 514. In this exemplary embodiment in block 514 the switch proxy does not terminate call processing services until such time as any ongoing 9-1-1 calls are completed, optionally this block may be omitted. Processing in block 516 causes trunk interface unit 304 to release trunk 132 (e.g., by entering into a disconnected or high impedance state) in preparation to restoring control to the host switch 102 through trunk 128. Continuing with block 518, bypass switch 312 is closed, restoring control of remote terminal 124 to host switch 102 and subsequently switch proxy 130 returns to bypass and monitoring mode 402.

Figure 6:
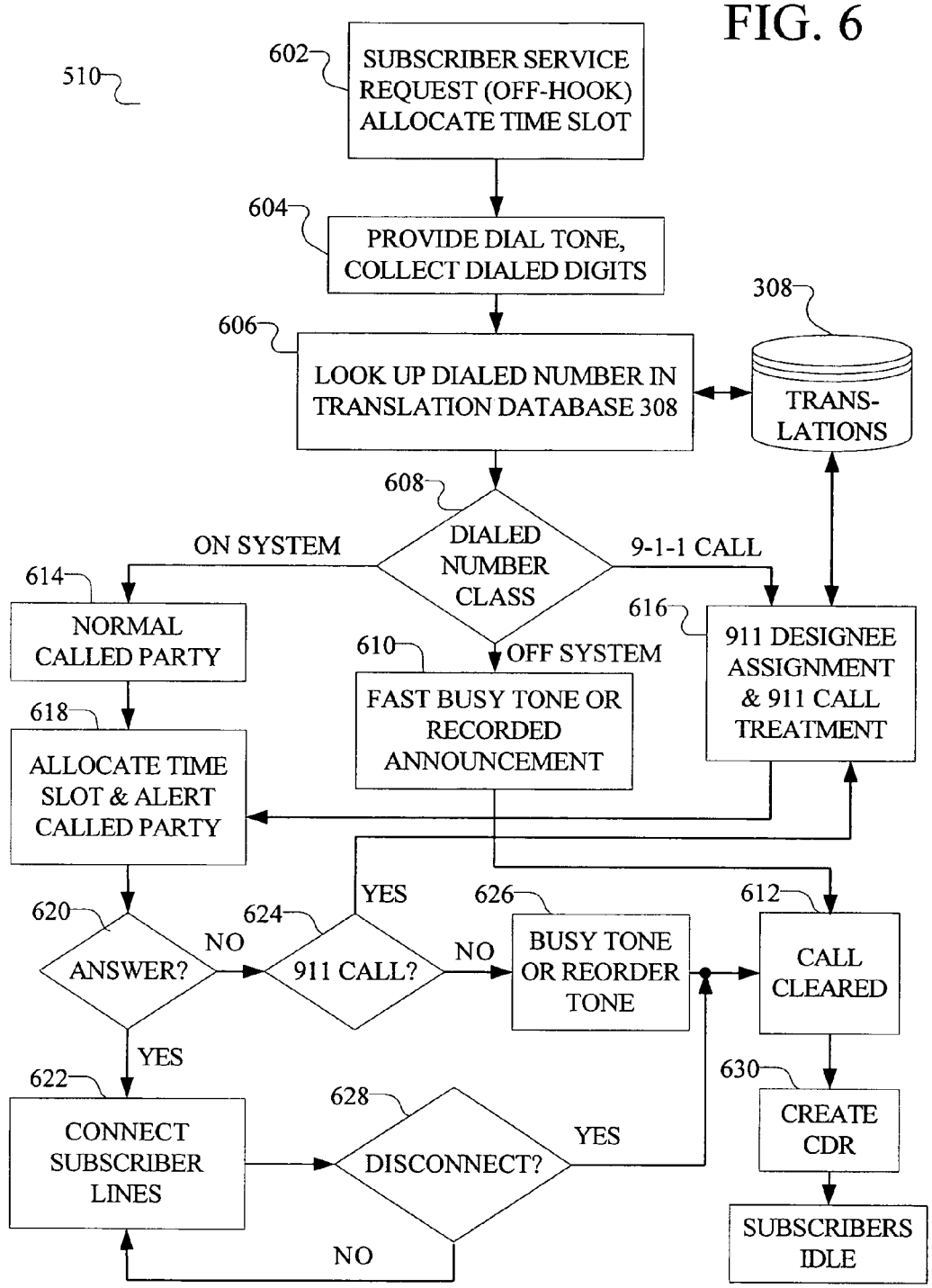
FIG. 6 is a flow chart describing an exemplary embodiment of call processing functions of a switch proxy.

FIG. 6 expands upon the details of FIG. 5 and provides an exemplary embodiment of the call processing block 510. For simplicity and as is common in the art, subscriber lines which originate a call are referred to as "calling" parties and those subscriber lines to which a call is placed are referred to as "called" parties. As described in the foregoing discussion of FIG. 5, call processing block 510 is evoked after establishment of the control of remote terminal 124 in the emergency stand alone mode 404. Beginning with block 602 wherein the controller 306 awaits a control message from remote terminal 124 through trunk interface unit 304 that a subscriber served by remote terminal 124 has gone off-hook and therefore requires service. In the case of a concentrating protocol (e.g., GR-303) switch proxy 130 then sends a control message to remote terminal 124 allocating a time slot on trunk 132 for the calling (off-hook) subscriber to use. In block 604 controller 306 connects the time slot allocated in the previous step to tones and receivers unit 318 by means of switching fabric 302 whereby calling party receives dial tone and has a digit receiver (both for rotary dialing and dual tone multi-frequency dialing, known in the art as an "originating register") provided. After a proscribed number of dialed digits have been collected, processing moves to block 606 whereupon controller 306 interrogates translations database 308 as to the status of the called party as represented by the dialed number. For the purposes of this discussion, decision block 608 interprets the status of called party in one of three ways, to whit: that called party is on remote terminal 124 or other system (not shown) served by switch proxy 130, called party is not on a served system, or that called party is 9-1-1. These three conditions require distinctive processing. One skilled in the art will understand that dial plans can be more complex than in the aforementioned exemplary embodiment and can be accommodated within the context of this invention.

Continuing on after decision block 608, should the called party not be a subscriber served by switch proxy 130 (i.e., "off system") processing passes to block 610 whereby controller 306 causes an appropriate call-progress tone (e.g., "fast busy") or recorded announcement from tones and receiver unit 318 to be connected to the calling party through switching fabric 302. After the calling party returns to on-hook or after a suitable time the call is cleared in block 612. If decision block 608 confirms that the called party is served by switch proxy 130 (i.e., "on system"), processing is passed to block 614 whereupon the call is classified as a "normal call" (i.e., not a 9-1-1 call) for the duration of the call.

Finally, if the result of decision block 608 is that the called party is 9-1-1, processing is passed to block 616 whereupon the call is classified as a 9-1-1 call and afforded special treatment for the duration of the call. Connection with the public safety answering point ("PSAP"), as would be the case when functional communications exists between remote terminal 124 and host switch 102, is not possible. In accordance with another aspect of this invention, translations database 308 contains one or more 9-1-1 designates, such as a sheriff's office or fire department, which may be advantageously associated with a specific calling party in order of preference. For example, the preferred 9-1-1 designate for a given calling party may be the one that is nearest in proximity. Initially the preferential 9-1-1 designate for this calling party is selected as the called party. If a 9-1-1 designate is busy on a call that is not a 9-1-1 call, the system will drop the existing non-9-1-1 call and will quickly connect the incoming emergency call to the 9-1-1 designate. Should processing return to block 616 as a result of a failure to complete this call, successive 9-1-1 designates are chosen and the call attempt is repeated (i.e., a "hunt group"). One skilled in the art will appreciate that many alternatives to this exemplary method of selecting alternative 9-1-1 designates to optimize the response to the calling party are possible. For example, a plurality of 9-1-1 designates could be simultaneously called and the first to answer assigned the call. This simultaneous call approach is a favored approach because it potentially finds a 9-1-1 designate faster than the hunt group approach.

It should be noted that if a 9-1-1 designate had an answering machine, the switch proxy could deliver emergency calls to the 9-1-1 designate's answering machine with potentially disastrous results. Thus, 9-1-1 designates should be instructed not to connect any answering machines to 9-1-1 designate lines.

Whether a normal or 9-1-1 call, processing will transfer to block 618. Controller 306 communicates through trunk interface unit 304 to remote terminal 124 the port address of the called party, obtained in blocks 606 or 616 from translations database 308, and allocates a second time slot on trunk 132 for the called party and communicates this with remote terminal 124. Communications between controller 306 and remote terminal 124 utilize control signals embedded in trunk 132 and the applicable signaling protocol. Simultaneously remote terminal 124 is caused to initiate ringing on the called party's line. Controller 306 causes switching fabric 302 to connect the calling party time slot to an "audible ringing" tone via tones and receivers unit 318.

Also in accordance with another aspect of this invention, special ringing patterns and caller ID messages may be sent to the called party in the event of a 9-1-1 call to advantageously alert the 9-1-1 designate as to the nature of the call. It is important that incoming emergency calls be identified to the 9-1-1 designate so that they are managed correctly. For example, if an emergency call were to come in at suppertime, and the 9-1-1 designate was unaware that the call was an emergency call, the designate may choose to ignore the call with possible disastrous results. Therefore, the system provides incoming emergency calls with "distinctive ringing", that is, a ringing signal with an on/off pattern that is recognized as unique, so that the 9-1-1 designate recognizes that the incoming call is an emergency call. This allows the 9-1-1 designate to give the call proper (urgent) answering priority and to answer the call with an appropriate greeting.

When an emergency arises and an emergency call is made over normally operational telephone company communication systems, the emergency call is delivered to a PSAP, as is discussed above. Along with the call itself, ANI and ALI information are also delivered to the PSAP emergency operator, so that the operator knows (as a minimum) the telephone number and the address of the emergency caller and can dispatch emergency responders appropriately. This is important for a variety of reasons: because the caller may be hysterical, the caller may drop the telephone, the caller may become incapacitated, the call may be cut off, etc. In the switch proxy system described here, delivery of 9-1-1 caller information to a 9-1-1 designate is as important for the same reasons when in Emergency Stand Alone mode. In the present switch proxy system, the emergency caller's telephone number and name can be delivered using conventional telephony caller identification (Caller ID) mechanisms. In this context, as is well known in the art, these means consist of sending voiceband data signals containing the emergency caller's telephone number and name in the transmission path from the switch proxy to the 9-1-1 designate during the silent interval between ringing bursts. The 9-1-1 designate needs to have a Caller ID display connected to the 9-1-1 designated line to receive and display the calling telephone number and name. In cases where the 9-1-1 designate needs only to be delivered the telephone number and name of emergency callers, conventional Caller ID equipment may be used.

In cases where it is desirable to deliver additional information, such as but not limited to, the emergency caller's address, to the 9-1-1 designate the designate line should have enhanced Caller ID equipment which contains additional data receiving and displaying capabilities. Furthermore, the switch proxy should have the ability to identify, encode and send the additional information. The switch proxy database should contain provisioning information indicating the capabilities of individual 9-1-1 designate's Caller ID equipment to optimize delivery of emergency caller's supplemental information. By means of this conventional and extended caller ID capability, the switch proxy in an advantageous and novel manner provides essential information to the 9-1-1 designate that hitherto would only have been available to personnel at the PSAP.

In block 618, by means of an inquiry to database 308, the capabilities of 9-1-1 designates to receive information related to the calling party may be ascertained and appropriate data signals sent as part of the "alerting" process towards the called party or parties. In the exemplary embodiment of FIG. 3, when operating in ESA mode and a time slot has been established between the 9-1-1 designate and the trunk interface unit 304, controller 306 may cause these data signals to be sent from tones and receivers unit 318 by means of switching fabric 302.

The clearing of a stable call, represented by block 622, is addressed in block 628 and requires particular attention in this exemplary embodiment in that it is advantageous to treat disconnection of normal calls and 9-1-1 calls differently. Whereas it is acceptable to clear stable calls of the "normal"

type whenever either party returns to an on-hook state; control of the disconnection of a 9-1-1 call should, at least optionally, be the sole prerogative of the called party (i.e., the 9-1-1 designate). That is, should the calling party in a 9-1-1 call prematurely go on-hook it is desirable that the calling party be able to return to off-hook and continue the conversation with the 9-1-1 designate until such time as the called party goes to an on-hook state. This is known in the art as "called party control".

Under this "called party control," the connection between the emergency caller and the 9-1-1 designate does not get torn down when the emergency caller hangs up. It requires the 9-1-1 designate to hang up before the call is torn down. Thus, for example, if the emergency caller hangs up and tries to make another call while the 9-1-1 designate stays on the first call, the emergency caller is reconnected to the 9-1-1 designate as soon as the emergency caller goes off hook.

One last functional block in FIG. 6 needs to be addressed. All calls cleared from the system during ESA operation, regardless of cause, pass from block 612 onto block 630 which generates a record of the call for audit purposes. These records, known in the art as Call Detail Records (CDRs), contain information related to each call attempt which may include but is not limited to: calling and called party numbers, outcome of the call attempt, time and duration of the call, etc. These CDRs document the system operation while disconnected from the host switching system and afford some liability protection. The CDRs may be optionally retrieved from the switch proxy locally or archived through communications with the switch proxy management system.

In each of these cases it is necessary for the switch proxy to have access to a database containing port identifiers, names, telephone numbers, and optionally, supplemental information to support these features. The information in this database may be collected in several ways. Since the information needed is available in existing telephone company and public safety databases, it may be collected by searching for and retrieving the needed information in those databases. A similar manual mechanism can be used if the information needed is available in printed or on-line reports. In this case, a clerk periodically updates the database in the switch proxy management system (described herein, below, in conjunction with FIG. 7 and FIG. 8), based upon these reports. Once compiled, the information may periodically be downloaded to the switch proxy for use during Emergency Stand Alone mode. A mechanism for learning the telephone number of each port identifier in a DLC system using test calls has been described elsewhere. However, any name and address information will need to be collected from external databases and provided to the switch proxy either manually or automatically via a mechanized data delivery system. Because telephone systems are constantly changing as a result of responding to service orders, it is necessary to update these data in a timely way to insure that they are correct. Failure to update the switch proxy database in a timely way could result in sending emergency responders to incorrect locations with potentially disastrous results.

Figure 7:
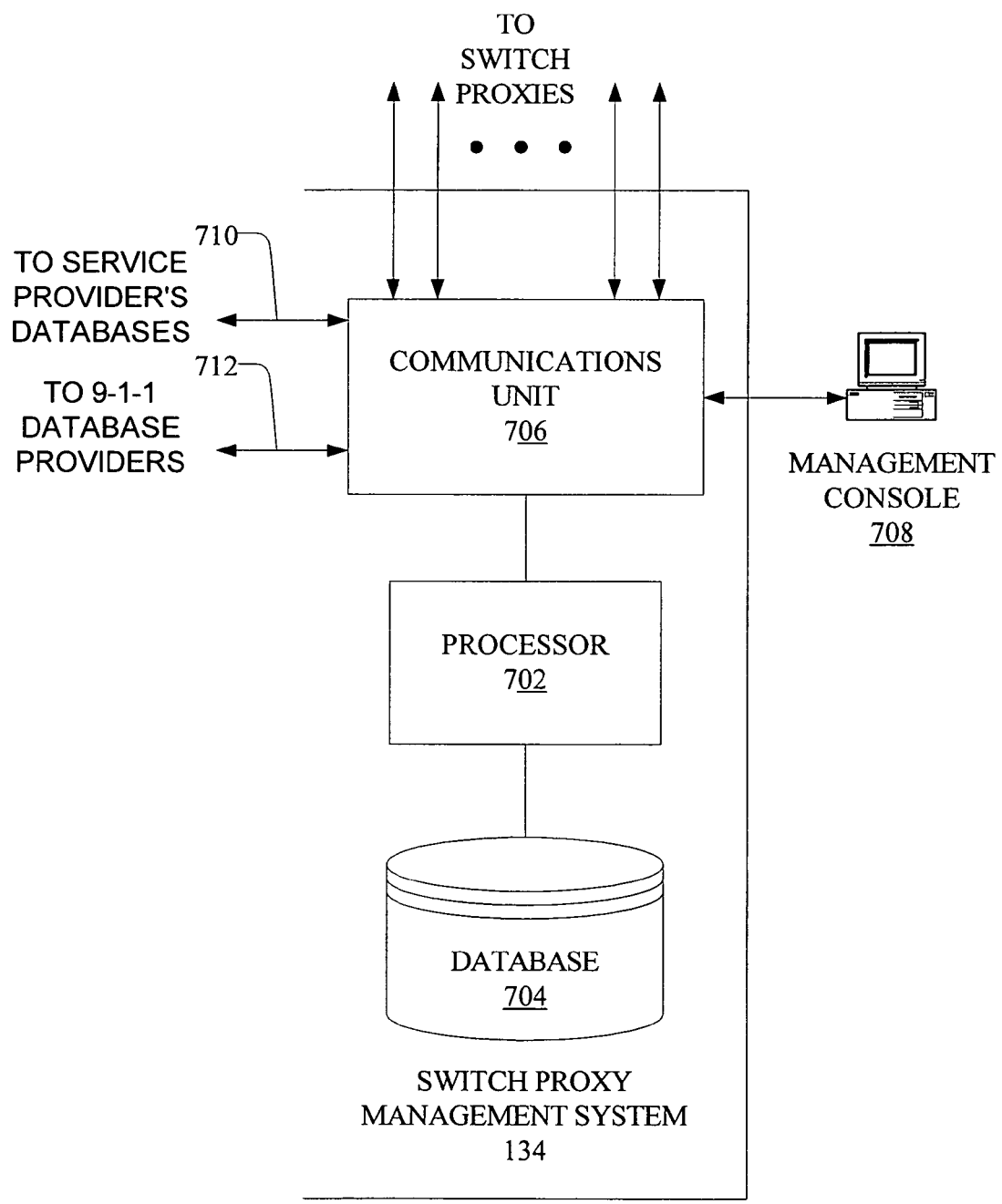
FIG. 7 is a block diagram illustrating the functional components of a switch proxy management system.

FIG. 7 is a block diagram of an exemplary embodiment of a switch proxy management system 134 in accordance with another aspect of this invention. This switch proxy management system 134 generally comprises a database 704 and a communications unit (or units) 706, all responsive to processor 702. At least one file is kept for each switch proxy in database 704, wherein translations records for each line (such as lines 118 and 120) served by a switch proxy 130 are maintained. At a minimum, these records correlate the physical port address of the subscriber lines on the remote terminal with the telephone number. Additional information which may be associated with the subscriber line include, but are not limited to: name and address of the subscriber, emergency responders contact telephone numbers, and related information that would be useful during an emergency. This database may also be used to maintain operational information related to each switch proxy such as, but not limited to: configuration data, current software loads, aforementioned Call Detail Records, and time zone. Database 704 must be initially populated correctly and then maintained current, most importantly with respect to subscriber changes. This may be done manually (through e.g., management console 708) or in an automated fashion by reference to other databases that are maintained for other purposes such as, but not limited to, the service provider's operational support system or billing system through interface 710, or third-party databases such as those maintained by 9-1-1 database providers through interface 712. Said service provider's operational support system may be the same system that keeps translation database 212 of local switch 102 current.

Figure 8:
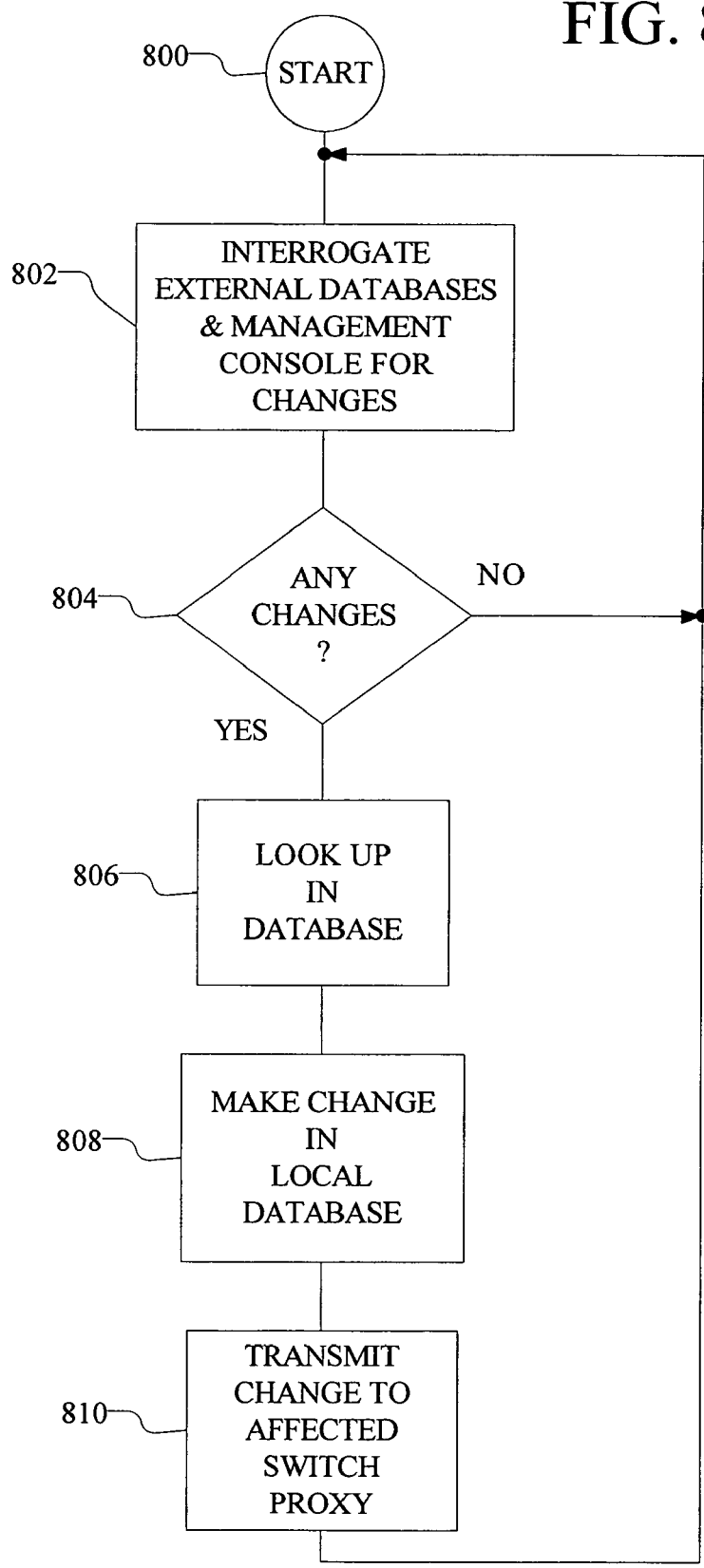
FIG. 8 is a flow chart illustrating the operation of the switch proxy management system of FIG. 7.

The operation of switch proxy management system 134 will now be described in the context of the flow chart of FIG. 8 taken in conjunction with the block diagram of FIG. 7. Processing starts in circle 800. In block 802, controller 702 causes communications unit 706 to interrogate external databases through interfaces 710 and 712 and management console 708 for changes. Processor 702 determines whether the data affects any line served by a switch proxy by comparing the data received to data in database 704 in decision block 804. If no change affecting any switch proxy is detected, then processing loops back to block 802 and the change is ignored.

If, in decision block 804, a change affecting one or more lines served by a switch proxy is detected, then a database lookup is performed on the affected line or lines in block 806. Changes are recorded in database 704 in block 808. Finally, all changes are transmitted to the affected switch proxy via communications unit 706. The changes may be transmitted when discovered or may be transmitted as a batch job during non-peak times.

While this exemplary embodiment is described in terms of a direct connection between switch proxy management system 134 and one or more switch proxies and external databases through interfaces 710 and 712, one skilled in the art will appreciate that there are many ways to provide this interconnection. For example, these connections may be over dial-up modems, Ethernet, or proprietary telemetry networks.

It is to be understood that the above-described embodiments of this invention are merely illustrative of the present invention and that many variations of the above-described embodiments can be devised by one skilled in the art without departing from the scope of the invention. It is therefore intended that such variations be included within the scope of the following claims and their equivalents.

We claim:

1. A switch proxy for controlling a remote terminal when said remote terminal is isolated from its controlling local switching system, wherein the remote terminal is connected to the controlling local switching system by a trunk and supports a plurality of subscriber telephone lines, said switch proxy comprising:

a controller;

a translations database maintaining translations for switching calls among the subscriber telephone lines supported by the remote terminal, said translation database further maintaining translations for switching 9-1-1 calls from subscriber telephone lines to 9-1-1 designates supported by the remote terminal; and a switching fabric controlled by the controller and said translations database to switch calls among the subscriber telephone lines supported by the remote terminal when connection between the remote terminal and the local switching system is lost.

2. The switch proxy of claim 1 further comprising a trunk monitoring unit monitoring control signals between the local switching system and the remote terminal on said trunk and notifying the controller whenever connection between the remote terminal and local switching system has been lost.

3. The switch proxy of claim 1 further comprising a trunk monitoring unit monitoring alarm signals on said trunk between the local switching system and the remote terminal and notifying the controller whether connection between the remote terminal and local switching system has been lost.

4. The switch proxy of claim 1 further comprising a bypass switch responsive to the controller on said trunk between the local switching system and the remote terminal that removes the switch proxy from active participation in the transmission path until required.

5. The switch proxy of claim 1 further comprising a tones and receivers unit responsive to the controller that receives dual tone multi-frequency dialing and provides call progress tones, recorded announcements, and caller ID data signals for subscriber telephone lines supported by the remote terminal (s).

6. The switch proxy of claim 1 wherein 9-1-1 calls are routed to a hunt group containing a plurality of 9-1-1 designates.

7. The switch proxy of claim 1 wherein 9-1-1 calls are simultaneously routed to a plurality of 9-1-1 designates and the first 9-1-1 designate to answer is assigned the call.

8. The switch proxy of claim 1 wherein distinctive ringing is used for a 9-1-1 call routed to a 9-1-1 designate.

9. The switch proxy of claim 1 wherein traditional caller ID information (calling number and name) for the 9-1-1 call is provided to the 9-1-1 designate.

10. The switch proxy of claim 1 wherein supplemental information for the 9-1-1 call is encoded within the caller ID format and received by the 9-1-1 designate using special receiving apparatus.

11. The switch proxy of claim 1 wherein the 9-1-1 designate is provided with called party control of the 9-1-1 call.

12. The switch proxy of claim 1 wherein the switch proxy interrupts an existing normal (not a 9-1-1) telephone call to the 9-1-1 designate prior to connecting the 9-1-1 call.

13. The switch proxy of claim 1 wherein a record relating to the details each call originated during ESA mode is created and archived for later retrieval.

14. A method for controlling a remote terminal when said remote terminal is isolated from its controlling local switching system, wherein the remote terminal is connected to the local switching system by a trunk and supports a plurality of subscriber telephone lines, said method comprising:
monitoring the trunk for alarms and/or local switching system/remote terminal control signal dialogue to determine whether the remote terminal is isolated from the local switching system;
maintaining a translations database containing information for switching calls among the subscriber telephone lines supported by the remote terminal, said translations database also including translations for switching 9-1-1 calls from subscriber telephone lines to 9-1-1 designates supported by the remote terminal; and
switching calls among the subscriber telephone lines supported by the remote terminal when the remote terminal is isolated from the local switching system.

15. The method of claim 14 further comprising operating a bypass switch on said trunk between the local switching system and the remote terminal that removes the emergency stand alone apparatus from active participation in the transmission path until required.

16. The method of claim 14 wherein 9-1-1 calls are routed to a hunt group containing a plurality of 9-1-1 designates.

17. The method of claim 14 wherein 9-1-1 calls are simultaneously routed to a plurality of 9-1-1 designates and the first 9-1-1 designate to answer is assigned the call.

18. The method of claim 14 wherein distinctive ringing is used for a 9-1-1 call routed to a 9-1-1 designate.

19. The method of claim 14 wherein caller traditional ID information (calling number and name) for the 9-1-1 call is provided to the 9-1-1 designate.

20. The method of claim 14 wherein the 9-1-1 designate is provided with called party control of the 9-1-1 call.

21. The method of claim 14 wherein the switch proxy interrupts an existing normal (not a 9-1-1) telephone call to the 9-1-1 designate prior to connecting the 9-1-1 call.

22. The method of claim 14 wherein supplemental information for the 9-1-1 call is encoded within the caller ID format and received by the 9-1-1 designate using special receiving apparatus.

23. The method of claim 14 wherein a record relating to the details of each call originated during ESA mode is created and archived for later retrieval.

24. A method for controlling a remote terminal when said remote terminal is isolated from its controlling local switching system and a subscriber originating a 9-1-1 call has been detected on said remote terminal, said method comprising:
determining the line identification of the subscriber from which the digit signals 9-1-1 were received;
selecting at least one 9-1-1 designate to which to connect the 9-1-1 call based on the determined line identification using a translations database; and
connecting the 9-1-1 call to the selected 9-1-1 designate.

25. The method of claim 24 further comprising selecting a 9-1-1 designate to connect by traversing a hunt group consisting of a plurality of 9-1-1 designates to ensure that the 9-1-1 call is completed.

26. The method of claim 24 further comprising providing the 9-1-1 designate with called party control over the 9-1-1 call.

* * * * *